United States Patent
Wei et al.

(10) Patent No.: US 12,004,072 B2
(45) Date of Patent: Jun. 4, 2024

(54) NETWORK SEARCH METHOD AND TERMINAL DEVICE

(71) Applicant: Huawei Technologies Co., Ltd., Shenzhen (CN)

(72) Inventors: Zhenrong Wei, Shenzhen (CN); Li Shen, Shenzhen (CN); Yong Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 17/432,834

(22) PCT Filed: Feb. 23, 2019

(86) PCT No.: PCT/CN2019/075985
§ 371 (c)(1),
(2) Date: Aug. 20, 2021

(87) PCT Pub. No.: WO2020/168578
PCT Pub. Date: Aug. 27, 2020

(65) Prior Publication Data
US 2022/0159551 A1 May 19, 2022

(51) Int. Cl.
*H04W 48/04* (2009.01)
*H04W 36/00* (2009.01)

(52) U.S. Cl.
CPC ........ *H04W 48/04* (2013.01); *H04W 36/0011* (2013.01)

(58) Field of Classification Search
None
See application file for complete search history.

(56) References Cited

U.S. PATENT DOCUMENTS

2018/0234878 A1\* 8/2018 Anand ............... H04W 48/18
2019/0014612 A1\* 1/2019 Lee .................. H04W 52/0212
2019/0261264 A1 8/2019 Lou et al.

FOREIGN PATENT DOCUMENTS

CN 104219732 A 12/2014
CN 105611583 A 5/2016
(Continued)

OTHER PUBLICATIONS

3GPP TS 23.501 Draft V16.0.0+ "3rd Generation Partnership Project;Technical Specification Group services and System Aspects; SystemArchitecture for the 5G System; Stage 2 (Release 16)," Feb. 2019, 281 pages.
(Continued)

*Primary Examiner* — Frantz Bataille
(74) *Attorney, Agent, or Firm* — Conley Rose, P.C.

(57) ABSTRACT

A network search method includes receiving, by a terminal device, a user operation, where the user operation requests communication with a network device by using a $5^{th}$ Generation (5G) access technology; and when a cell with which the terminal device currently registers is a non-allowed area, searching for a second cell, where the second cell is an allowed area, so that the terminal device communicates with the network device in the second cell by using the 5G access technology. Therefore, when actively initiating a service, the terminal device in the non-allowed area may actively search for a cell that is an allowed area, to communicate with the network device by using the 5G access technology.

22 Claims, 7 Drawing Sheets

(56) References Cited

FOREIGN PATENT DOCUMENTS

| CN | 106792625 A | 5/2017 |
|---|---|---|
| CN | 108024314 A | 5/2018 |
| CN | 109089297 A | 12/2018 |
| WO | 2018013405 A1 | 1/2018 |
| WO | 2018067914 A1 | 4/2018 |
| WO | 2018141155 A1 | 8/2018 |

OTHER PUBLICATIONS

Nec, "Emergency service rejection by the AMF," C1-186472, 3GPP TSG-CT WG1 Meeting #112bis, Vilnius (Lithuania), Oct. 15-19, 2018, 11 pages.

"3rd Generation Partnership Project; Technical Specification Group Core Network and Terminals; Non-Access-Stratum (NAS) protocol for 5G System (5GS); Stage 3 (Release 15)," 3GPP TS 24.501 V15.2.1, Jan. 2019, 455 pages.

* cited by examiner

NETWORK SEARCH METHOD AND TERMINAL DEVICE

CROSS-REFERENCE TO RELATED APPLICATIONS

This application is a National Stage of International Patent Application No. PCT/CN2019/075985 filed on Feb. 23, 2019, which is hereby incorporated by reference in its entirety.

TECHNICAL FIELD

This application relates to the communications field, and more specifically, to a network search method and a terminal device.

BACKGROUND

Currently, in some communications systems, for example, a $5^{th}$ generation (5th generation, 5G) system, based on factors such as a user level and a special purpose of a geographical location, a network device may configure an allowed area (allowed area) and a non-allowed area (non-allowed area) for a terminal device. For example, a military area may be a non-allowed area for a common user. A terminal device located in or near the military area may receive configuration information from a network device, to notify the terminal device that the military area is a non-allowed area.

When the terminal device is located in the non-allowed area, the terminal device cannot actively perform any service other than an emergency call, for example, make a call, browse a web page, or send an SMS message. However, the configuration information is only sent to a non-access stratum (non-access stratum, NAS) of the terminal device. After receiving a request that is used for actively initiating a service and that is from an application layer, the NAS may not process the request because the NAS is located in the non-allowed area. However, these are not perceived by the application layer. The terminal device still displays a signal in a user interface, but actual communication is blocked. As a result, the user cannot actively initiate a service when there is signal coverage, which affects user experience.

SUMMARY

This application provides a network search method and a terminal device, to improve user experience.

According to a first aspect, a network search method is provided. The method includes: receiving, by a terminal device, a user operation, where the user operation requests communication with a network device by using a $5^{th}$ generation 5G access technology; and when a first cell with which the terminal device currently registers is a non-allowed area, searching for a second cell, where the second cell is an allowed area.

It should be understood that the method provided in the first aspect may be performed by the terminal device, or may be performed by a network search apparatus, for example, a chip, configured in the terminal device. This is not limited in this application.

Based on the foregoing technical solution, when determining that the terminal device is in the non-allowed area, the terminal device may actively search for a cell that belongs to the allowed area. When the second cell is found, the terminal device communicates with the network device in the second cell by using the 5G access technology. In this way, a case in which the terminal device cannot communicate with the network device in the non-allowed area can be avoided, so that the terminal device in the non-allowed area may likely perform communication by using the 5G access technology. This helps improve user experience.

With reference to the first aspect, in some implementations of the first aspect, the method further includes: when the second cell is found, performing communication with the network device in the second cell by using the 5G access technology.

To ensure best user experience, when the terminal device can find a cell that belongs to the allowed area, the terminal device communicates with the network device in the allowed area by preferentially using the 5G access technology.

With reference to the first aspect, in some implementations of the first aspect, the method further includes: when the second cell is not found, performing communication with the network device by using any one of a $4^{th}$ generation 4G access technology, a $3^{rd}$ generation 3G access technology, a $2.5^{th}$ generation 2.5G access technology, or a $2^{nd}$ generation 2G access technology.

To ensure that a user can communicate with the network device, when a cell that belongs to the allowed area is not found, the terminal device may communicate with the network device by using another access technology other than 5G. In this way, a case in which the terminal device cannot communicate with the network device in the non-allowed area can be avoided to a maximum extent, and this helps improve user experience.

With reference to the first aspect, in some implementations of the first aspect, the method further includes: adding one or more cells including the first cell and/or one or more tracking areas including a tracking area to which the first cell belongs to a temporary prohibition list, where the cell and/or the tracking area added to the temporary prohibition list belong/belongs to the non-allowed area.

Each time the terminal device finds a cell that belongs to the non-allowed area, the terminal device may add the cell and/or a tracking area to which the cell belongs to the temporary prohibition list. One or more cells and/or one or more tracking areas that belong to the non-allowed area are/is added to the temporary prohibition list, so that the terminal device can be prevented from repeatedly determining whether a same cell or a cell in a same tracking area belongs to the non-allowed area, thereby helping reduce a workload of the terminal device, reduce a time that may be consumed by the terminal device to find the second cell, and reduce a communication delay that may be caused by searching for an allowed area by the terminal device.

With reference to the first aspect, in some implementations of the first aspect, the method further includes: after the communication between the terminal device and network device ends, or when the service request times out, deleting the one or more cells including the first cell and/or the one or more tracking areas including the tracking area to which the first cell belongs from the temporary prohibition list.

After the current communication ends or the service request times out, the terminal device may delete the cell or the tracking area recorded in the temporary prohibition list, that is, unprohibit the cell or the tracking area in the temporary prohibition list, so that the cell or the tracking area can be used when a service request is received next time.

With reference to the first aspect, in some implementations of the first aspect, the method further includes: receiving a service area list from the network device, where the service area list is used to indicate the non-allowed area or the allowed area.

The terminal device may determine the non-allowed area and the allowed area based on the service area list.

With reference to the first aspect, in some implementations of the first aspect, the method further includes: after entering an idle state, searching for a third cell, where the third cell is the allowed area.

Due to mobility of the terminal device, the terminal device may actively search for the allowed area after entering the idle state.

With reference to the first aspect, in some implementations of the first aspect, the method further includes: when the third cell is found, sending a mobility registration request to request to camp on the third cell.

When finding the allowed area, the terminal device may actively initiate a mobility registration procedure to request to camp on the allowed area. In this way, a 5G service can be better provided, and user experience can be improved.

According to a second aspect, a network search method is provided. The method includes: determining, by a terminal device, that a cell with which the terminal device currently registers is a non-allowed area; searching for a third cell, where the third cell is an allowed area; and initiating mobility registration, to request to camp on the third cell.

It should be understood that the method provided in the first aspect may be performed by the terminal device, or may be performed by a network search apparatus, for example, a chip, configured in the terminal device. This is not limited in this application.

Based on the foregoing technical solution, when determining that the terminal device is in the non-allowed area, the terminal device may actively search for a cell that belongs to the allowed area, for example, the third cell, and when finding the third cell, the terminal device may initiate a mobility registration procedure, to request to camp on the third cell. Therefore, the terminal device enters the allowed area, normal communication can be restored, and the terminal device is no longer restricted by the non-allowed area. This helps improve user experience.

With reference to the second aspect, in some implementations of the second aspect, the searching for a third cell includes: periodically scanning one or more cells other than the first cell, to search for the third cell.

Due to mobility of the terminal device, the terminal device may search, through periodic scanning, for a cell that belongs to the allowed area, for example, the third cell, to initiate mobility registration when the third cell is found, thereby camping on the third cell.

With reference to the first aspect or the second aspect, in some implementations, the terminal device in the allowed area is allowed to actively initiate communication with a network; and the terminal device in the non-allowed area is not allowed to actively initiate a service request or session management signaling other than a priority service to obtain a user service.

According to a third aspect, a network search apparatus is provided. The apparatus is included in a terminal device, and has a function of implementing an action of the terminal device in the first aspect and possible implementations of the first aspect. The function may be implemented by hardware, or may be implemented by hardware executing corresponding software. The hardware or the software includes one or more modules or units corresponding to the foregoing function, for example, a receiving unit or module, and a searching unit or module.

According to a fourth aspect, a network search apparatus is provided. The apparatus is included in a terminal device, and has a function of implementing an action of the terminal device in the second aspect and possible implementations of the second aspect. The function may be implemented by hardware, or may be implemented by hardware executing corresponding software. The hardware or the software includes one or more modules or units corresponding to the foregoing function, for example, a determining unit or module, a searching unit or module, and a registration unit or module.

According to a fifth aspect, a chip is provided. The chip includes a processor coupled to a memory. The processor is configured to invoke a computer program from the memory and run the computer program, to enable a device in which the chip is installed to perform the network search method in any possible implementation of any one of the foregoing aspects.

According to a sixth aspect, a terminal device is provided, including a screen, one or more processors, a memory, a plurality of applications, and one or more computer programs. The one or more computer programs are stored in the memory, and the one or more computer programs include instructions. When the instructions are executed by the terminal device, the terminal device is enabled to perform the network search method in any possible implementation of any one of the foregoing aspects.

According to a seventh aspect, a terminal device is provided, including one or more processors and one or more memories. The one or more memories are coupled to the one or more processors. The one or more memories are configured to store computer program code, and the computer program code includes computer instructions. When the one or more processors execute the computer instructions, the terminal device is enabled to perform the network search method in any possible implementation of any one of the foregoing aspects.

According to an eighth aspect, a computer storage medium is provided, including computer instructions. When the computer instructions are run on a terminal device, the terminal device is enabled to perform the network search method in any possible implementation of any one of the foregoing aspects.

According to a ninth aspect, a computer program product is provided. When computer program product runs on a terminal device, the terminal device is enabled to perform the network search method in any possible design of any one of the foregoing aspects.

DESCRIPTION OF EMBODIMENTS

The following describes technical solutions of this application with reference to accompanying drawings.

Figure 1:
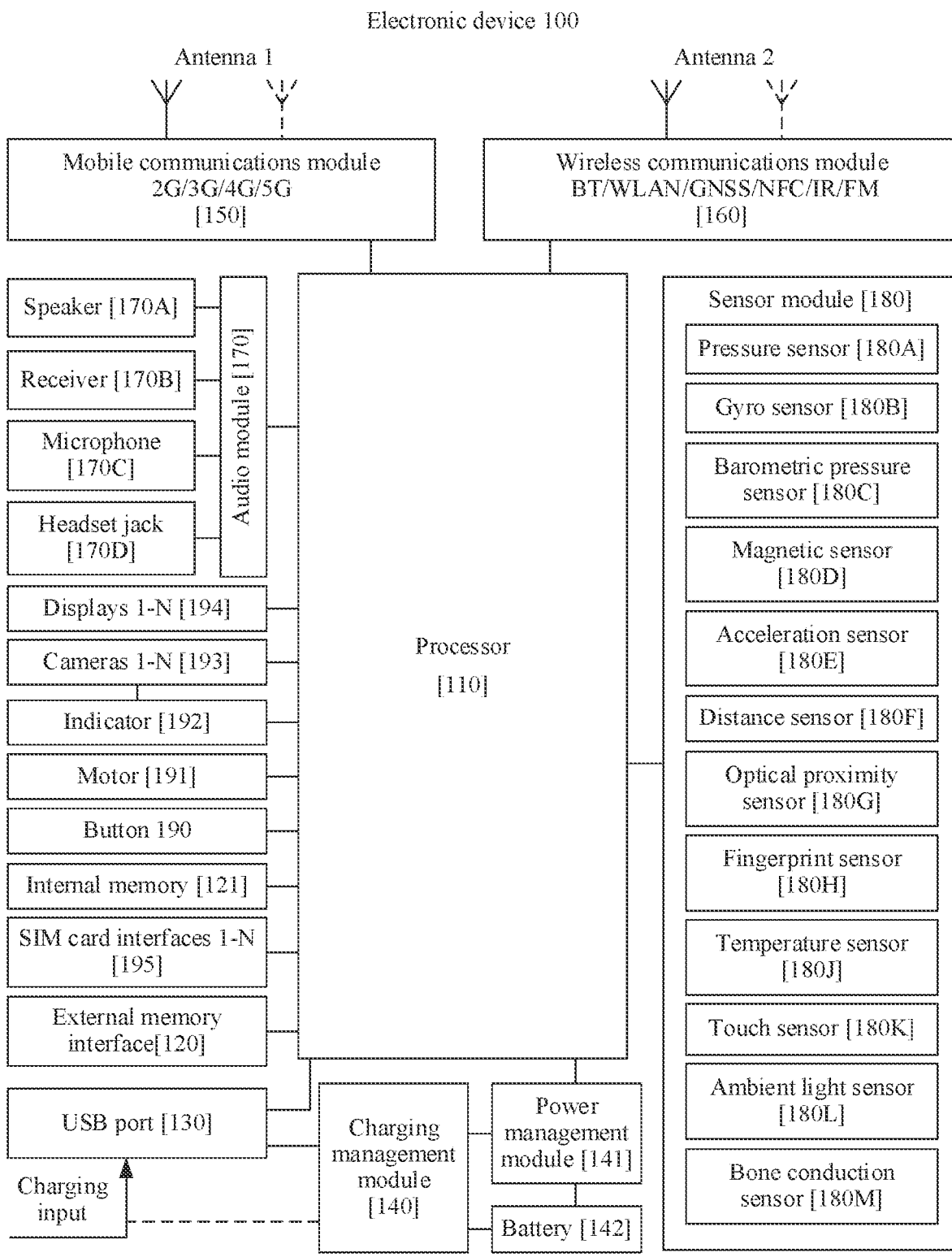
FIG. 1 is a schematic diagram of a hardware structure of an electronic device according to an embodiment of this application.

For ease of understanding of the embodiments of this application, an electronic device 100 shown in FIG. 1 is first used as an example to describe a terminal device to which the embodiments of this application are applicable.

FIG. 1 is a schematic diagram of a hardware structure of an electronic device according to an embodiment of this application. As shown in the figure, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a hone conduction sensor 180M, and the like.

It may be understood that the structure shown in FIG. 1 does not constitute any specific limitation on the electronic device 100. The electronic device 100 may alternatively include components more or fewer than those shown in the figure, or some components may be combined, or some components may be split, or there may be a different component arrangement. The components shown in the figure may be implemented by hardware, software, or a combination of software and hardware.

The processor 110 may include one or more processing units, for example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may further be disposed in the processor 110, and is configured to store an instruction and data. In some embodiments, the memory in the processor 110 is a high-speed cache memory. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In the processor 110, the application processor mainly processes an operating system, a user interface, an application, and the like. For example, when a user performs an operation on the terminal device, the application processor may initiate a corresponding service request based on the operation of the user.

The modem processor, the baseband processor, and the like each may be considered as a communication processor. The communication processor mainly processes wireless communication. For example, the communication processor may receive a service request from the application processor, and may actively initiate communication with a network device according to the service request.

In some embodiments, the processor 110 may include one or more interfaces. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured through software. The GPIO interface may be configured as a control signal interface or a data signal interface. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and may be specifically a mini (Mini) USB interface, a micro (Micro) USB interface, a USB Type C interface, or the like. The USB interface 130 may be configured to connect to the charger to charge the electronic device 100, or may be used for data transmission between the electronic device 100 and a peripheral device, or may be configured to connect to a headset to play audio by using the headset. This interface may further be configured to connect to another electronic device, for example, an augmented reality (augmented reality, AR) device.

It may be understood that an interface connection relationship between the modules shown in FIG. 1 is merely an example for description, and does not constitute a limitation on the structure of the electronic device 100. The electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 111 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modern processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 may provide wireless communication solutions that are applied to the electronic device 100, for example, the $2^{nd}$ generation (the $2^{nd}$ generation, 2G), the $2.5^{th}$ generation (2.5G), the $3^{rd}$ generation (3G), the $4^{th}$ generation (4G), and the $5^{th}$ generation (5G). The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, convert the amplified signal into an electromagnetic wave by using the antenna 1, and radiate the electromagnetic wave by using the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and is then transferred to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions that are applied to the electronic device 100, for example, wireless local area network (wireless local area network, WLAN) (such as a wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), and infrared (infrared, IR) technologies. The wireless communications module 160 may be one or more devices that integrate at least one communications processing module. The wireless communications module 160 receives an electromagnetic wave by using the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, convert the signal into an electromagnetic wave by using the antenna 2, and radiate the electromagnetic wave by using the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLD), an active-matrix organic light-emitting diode (active-matrix organic light-emitting diode, AMOLED), a flex light-emitting diode (flex light-emitting diode, FLED), a mini-LED, a micro-LED, a micro-OLED, a quantum dot light-emitting diode (quantum dot light emitting diodes, QLED), or the like. In some embodiments, the electronic device 100 may include one or more displays 194.

The electronic device 100 can implement the shooting function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or more cameras 193.

The digital signal processor is configured to process digital signals, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement audio functions by using the audio module 170, the speaker 170A, the receiver 170B, the microphone 170C, the headset jack 170D, the application processor, for example, implement a music playback function and a recording function.

The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5-mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch position but have different touch operation intensities may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyro sensor 180B may further be used in navigation and motion sensing game scenarios.

The barometric pressure sensor 180C is configured to measure barometric pressure. In some embodiments, the electronic device 100 calculates a sea level height based on the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, based on a detected opening or closing state of the leather case or a detected opening or closing state of the flip cover, features such as automatic unlocking of the flip cover are set.

The acceleration sensor 180E may detect accelerations in various directions (usually on three axes) of the electronic device 100, and may detect magnitude and a direction of gravity when the electronic device 100 is still. The acceleration sensor 180E may further be configured to identify a posture of the electronic device, and is applied to switching between a landscape mode and a portrait mode, and applications such as a pedometer.

The distance sensor 180F is configured to measure a distance. The electronic device 100 may measure a distance by using infrared or laser. In some embodiments, in a photographing scenario, the electronic device 100 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock the screen in a leather case mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the electronic device 100, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in the headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 can support one or more SIM card interfaces. The SIM card interface 195 may support a nano-SIM card, a micro-SIM card, a SIM card, and the like. A plurality of cards may be inserted into the same SIM card interface 195 at the same time. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 2:
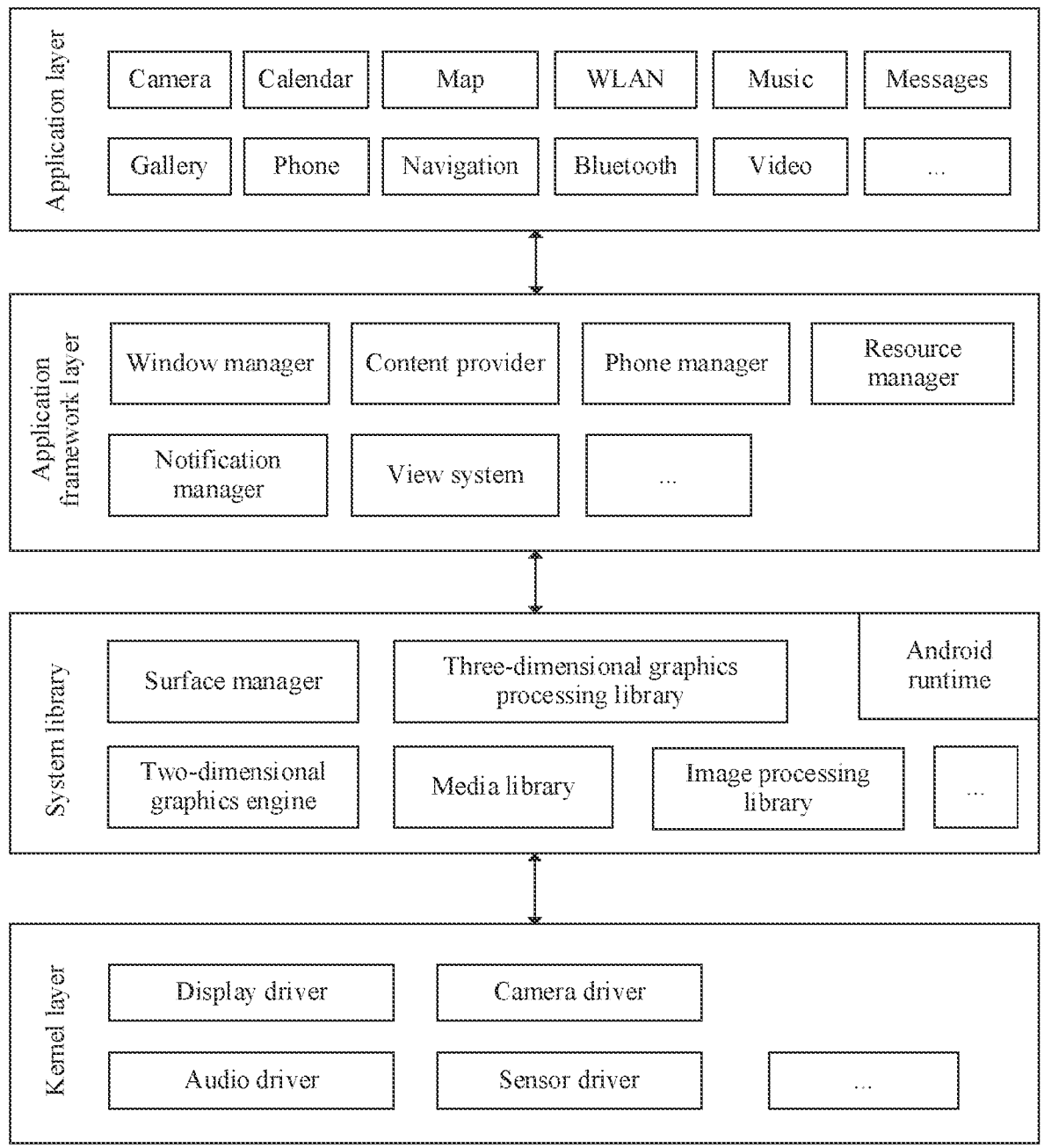
FIG. 2 is a schematic diagram of a software structure of an electronic device according to an embodiment of this application.

FIG. 2 is a diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers, namely, an application layer, an application framework layer, an Android runtime (Android runtime, ART), a system library, and a kernel layer from top to bottom. The application layer may include a series of application packages.

As shown in FIG. 2, the application packages may include applications such as "camera", "gallery", "calendar", "phone", "maps", "navigation", "WLAN", "Bluetooth", "music", "videos", and "SMS messages".

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of call statuses (including answering, declining, and the like).

The resource manager provides various resources for an application, such as a localized character string, an icon, an image, a layout file, and a video file.

The notification manager enables an application to display notification information in the status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: One part is a performance function that the Java language needs to schedule, and the other part is a kernel library of Android.

The application layer and the application framework layer run in the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library, and a 2D graphics engine.

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiment of this application, an electronic device having the structures shown in FIG. 1 and FIG. 2 is used as an example to describe in detail, with reference to FIG. 3 and FIG. 4, a scenario of a network search method provided in this embodiment of this application.

Figure 3:
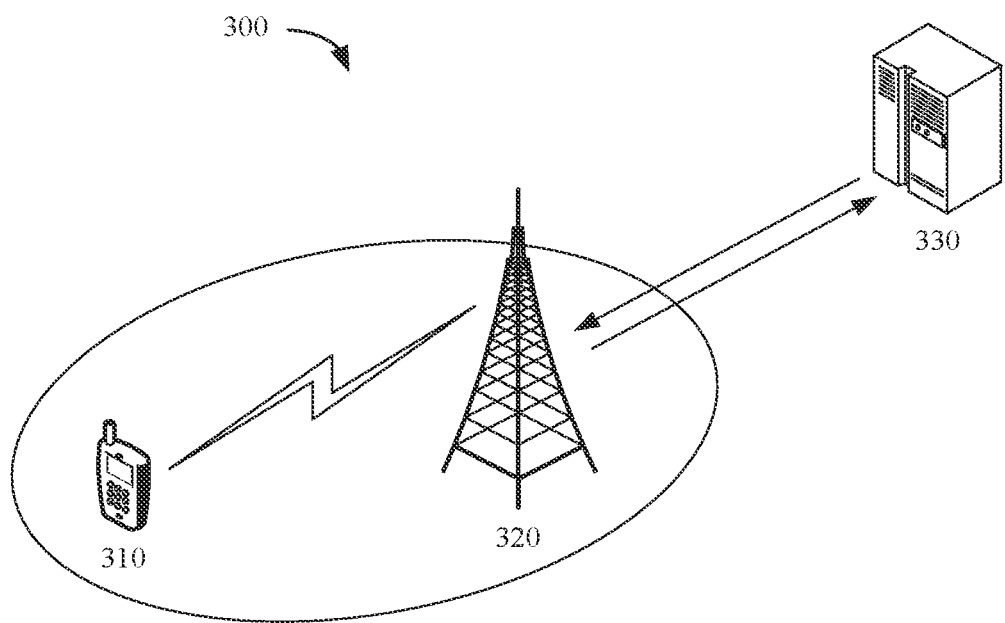
FIG. 3 is a schematic diagram of a scenario applicable to a network search method according to an embodiment of this application.

FIG. 3 is a schematic diagram of a communications system applicable to a network search method according to an embodiment of this application. As shown in the figure, the communications system 300 may include a terminal device 310, an access network (access network, AN) device 320, and a core network device 330.

The terminal device 310 may also be referred to as user equipment. The terminal device may include, for example, a mobile phone, a wristband, a watch phone, a tablet computer, a notebook computer, an ultra-mobile personal computer (ultra-mobile personal computer, UMPC), a personal digital assistant (personal digital assistant, PDA) device, a point of sales (point of sales, POS), a handheld device that has a wireless communication function, a computing device or another processing device connected to a wireless modem, a vehicle-mounted device, or a wearable device, but is not limited to a communications terminal.

The access network device may provide a network access function for an authorized user in a specific area, and may use transmission tunnels of different qualities based on a user level, a service requirement, and the like. Access networks may use different access technologies. Current radio access technologies include a $3^{rd}$ generation partnership project ($3^{rd}$ generation partnership project, 3GPP) access technology and a non-$3^{rd}$ generation partnership project (non-3GPP) access technology. The 3GPP access technology is an access technology that complies with a 3GPP standard specification. For example, the 3GPP access technology includes a radio access technology used in a $3^{rd}$ generation ($3^{rd}$ generation, 3G) system, a $4^{th}$ generation ($4^{th}$ generation, 4G) system, and a 5G system. An access network in which the 3GPP access technology is used is referred to as a radio access network (radio access network, RAN). An access network device in the 5G system is referred to as a next-generation node base station (next generation node base station, gNB). The non-3GPP access technology is an access technology that does not comply with the 3GPP standard specification, for example, an air interface technology represented by wireless fidelity (wireless fidelity, Wi-Fi).

An access network that implements a network access function by using a wireless communications technology may be referred to as an access network. The radio access network can manage radio resources, provide an access service for the terminal device, and further complete forwarding of a control signal and user data between the terminal device and a core network.

The radio access network may be, for example, a NodeB (NodeB, NB), an evolved NodeB (evolved NodeB, eNB or eNodeB), a gNB, a network device in a 5G network, or a network device in a future evolved PLMN. This is not limited in this embodiment of this application.

The core network device 330 may be configured to implement functions such as call connection, charging, mobility management, and a supplementary service. In the 5G system, the core network device may include, for example, an access and mobility management function (access and mobility management function, AMF) entity, a session management function (session management function, SMF) entity, and a user plane function (user plane function, UPF) entity. This embodiment of this application mainly relates to communication with the AMF entity. Therefore, a brief description of the AMF entity is provided herein. The AMF entity may also be referred to as an AMF for short, is mainly used for mobility management, access management, and the like, and may be configured to implement another function, other than session management, in mobility management entity (mobility management entity, MME) functions, for example, a lawful interception function and an access authorization (or authentication) function. The following uses the AMF in 5G as an example of a network element used for mobility and access management, and this shall not constitute any limitation on this application. This application does not exclude a possibility of replacing the AMF with another network element to implement same or similar functions.

The access network device and the core network device may be collectively referred to as a network device in the following embodiments.

In this embodiment of this application, the terminal device 310 may support a 5G access technology. The access network device 320 may be a base station, for example, a gNB, in the 5G access technology. A coverage area of the access network device 320 may include one or more 5G cells. For example, the terminal device 310 may be located in one of the 5G cells. The core network device 330 may be a core network device in the 5G access technology, for example, may include an AMF entity.

Figure 4:
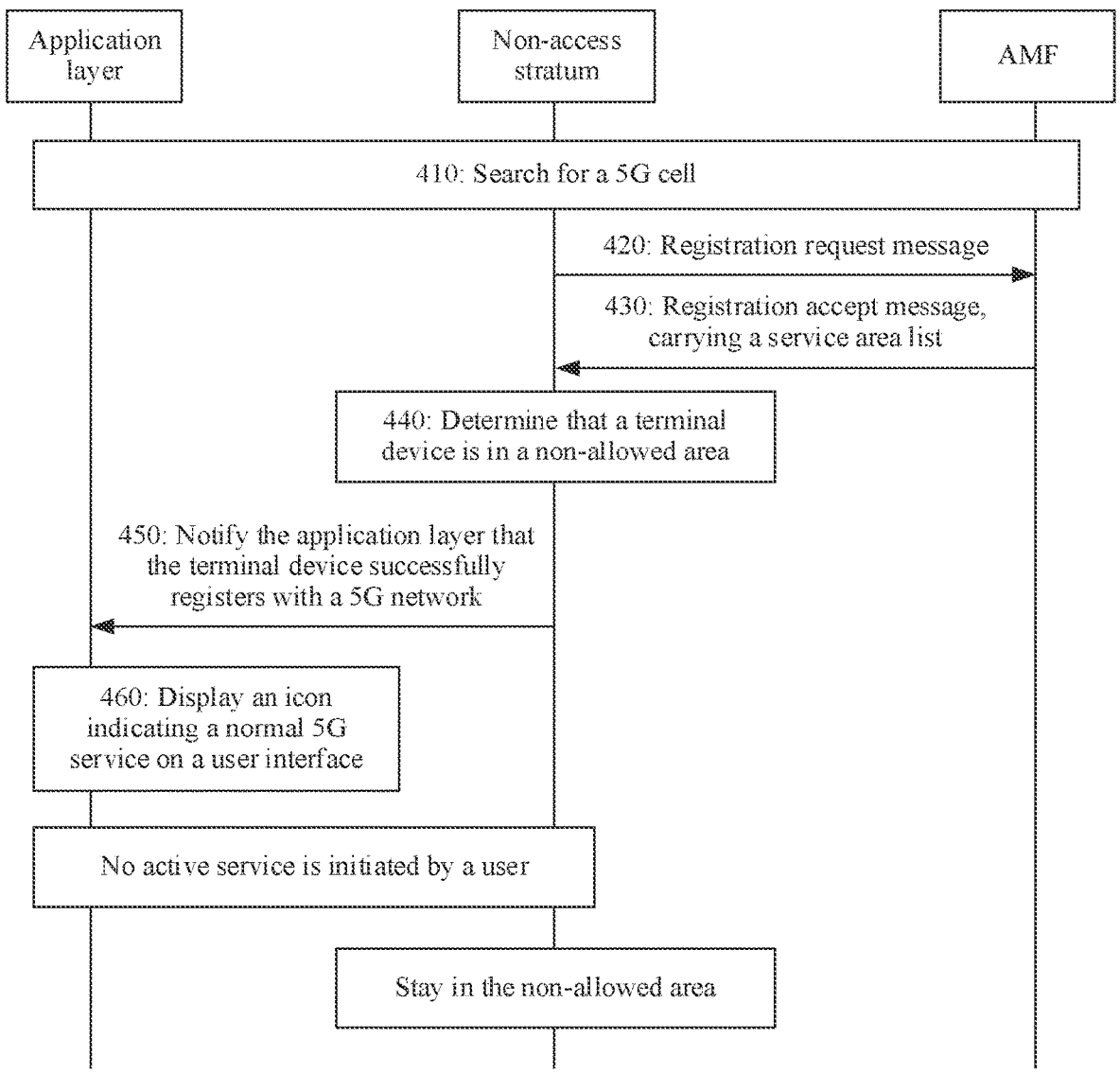
FIG. 4 is a flowchart of power-on registration of a terminal device according to an embodiment of this application.

The following briefly describes, with reference to FIG. 4, a specific process in which the terminal device registers with the 5G network after being powered on. FIG. 4 is a schematic flowchart of registering a terminal device with a 5G network.

It should be understood that FIG. 4 is merely an example, and schematically shows signaling related to this application in a registration procedure, but does not show all signaling in the registration procedure. However, this shall not constitute any limitation on this application. For a specific registration procedure of the terminal device, refer to the conventional technology. For brevity, details are not described in this specification.

It should be further understood that FIG. 4 is merely an example, and schematically shows interaction between an application layer and a non-access stratum in the terminal device and an AMF in a core network. However, this shall not constitute any limitation on this application. Interaction between the terminal device and a network device is not limited to the interaction between the application layer and the non-access stratum in the terminal device and the AMF. For ease of understanding, the following shows only network elements or modules related to this application.

It should be further understood that a procedure in which the terminal device registers with a 5G cell in the following example is shown only for ease of understanding of this embodiment of this application, and shall not constitute any limitation on this application.

In step 410, the terminal device searches for a 5G cell.

Specifically, for example, after the terminal device (the terminal device 310 shown in FIG. 3) is powered on or restarted, the terminal device may turn on a 5G service through a user operation or a default setting, to search for a 5G cell. For example, the terminal device may also search for a 5G cell during network re-registration or cell reselection. A scenario in which the terminal device searches for a 5G cell is not limited in this application.

The non-access stratum in the terminal device may select a public land mobile network (public land mobile network, PLMN), and trigger an RRC layer to search for a cell. For a specific process in which the terminal device selects a PLMN and search for a cell, refer to the conventional technology. For brevity, details are not described herein.

In step 420, the terminal device may send a registration request message to a core network device by using an access network device, to request to register with the 5G network.

Specifically, the non-access stratum in the terminal device may send the registration request message (registration request message) to the access network device (for example, the access network device 320 shown in FIG. 3), so that the access network device forwards the registration request message to the core network device (for example, the core network device 330 shown in FIG. 3, which may be specifically an AMF in the core network device). The registration request message may be used to request to obtain a service of the 5G network.

In step 430, the core network device may send a registration accept message (registration accept message) to the access network device, so that the access network device forwards the registration accept message to the terminal device. In this way, the terminal device successfully registers with the 5G network.

Specifically, the non-access stratum in the terminal device receives the registration accept message from the access network device. The registration accept message carries one or more information elements (information element, IE). The information element in the registration accept message may include a service area list (service area list).

In some cases, the service area list includes an indication of a service area restriction (service area restriction). Herein, the service area restriction is a concept proposed in the 5G network. A network can configure different service area restrictions (service area restriction) for different users based on subscription information of the users, geographical locations of terminals, and local policies. In other words, the concept of the service area restriction is not proposed in other networks other than the 5G network, such as 4G, 3G, 2.5G, and 2G networks. Specifically, the service area restriction is used to define an area in which the terminal device can or cannot actively initiate communication with the network device. In a current protocol, the area defined by the service area restriction may include an allowed area (allowed area) and a non-allowed area (non-allowed area). Correspondingly, in this embodiment of this application, the indication, described above, of the service area restriction may include an indication of the allowed area and/or an indication of the non-allowed area.

For ease of understanding, the allowed area and the non-allowed area are briefly described first. The terminal device in the allowed area can initiate normal communication with the network. The terminal device in the non-allowed area is not allowed to actively initiate a service request (service request) or session management signaling (session management signaling, SM signaling) to obtain a user service, regardless of whether the terminal device is in a connected state or an idle state. However, the terminal device may camp on the non-allowed area, may initiate a mobility management (mobility management, MM) registration process, and may also respond to paging of the core network and an access network. In other words, the terminal device in the non-allowed area is not allowed to initiate a service, for example, making a call, sending a message, or browsing a web page. However, when initiating a priority service, the terminal device may cover the restriction in the non-allowed area. The priority service may be, for example, an emergency service or a multimedia priority service (multimedia priority service, MPS).

It should be understood that, for specific definitions of the service area restriction, the allowed area, and the non-allowed area, refer to related descriptions in 3GPP protocols TS23.501 and TS24.501. For brevity, details are not described herein again. In addition, for ease of understanding, the foregoing briefly describes the service area restriction, the allowed area, and the non-allowed area based on definitions in the current protocol. This application does not exclude a possibility of modifying the definitions of the allowed area and the non-allowed area in a future protocol.

The service area list may carry the indication of the service area restriction. Specifically, the service area list may include the indication of the allowed area and/or the indication of the non-allowed area. If the service area list carries the indication of the allowed area and/or the indication of the non-allowed area, it may be considered that the terminal device receives the service area restriction.

If the service area list carries the indication of the allowed area, the terminal device may determine that any area that does not belong to the allowed area is a non-allowed area. Alternatively, if the service area list carries the indication of the non-allowed area, the terminal device may determine that any area that does not belong to the non-allowed area is an allowed area. Alternatively, if the service area list carries both the indication of the allowed area and the indication of the non-allowed area, the terminal device may directly determine which area is an allowed area and which area is a non-allowed area. In this case, it may be considered that the terminal device is in a service area restriction state.

If the allowed area or the non-allowed area is not indicated in the service area list, it may be considered that the terminal device does not receive the service area restriction, and the terminal device considers that any area in the PLMN is an allowed area. In this case, it may be considered that the terminal device is not in the service area restriction state.

In a possible design, the allowed area and the non-allowed area may be divided by using a tracking area as a unit. Therefore, the indication of the allowed area may include indication information of one or more tracking areas that belong to the allowed area, and the indication of the non-allowed area may include indication information of one or more tracking areas that belong to the non-allowed area.

The indication information of the tracking area may be, for example, a tracking area identity (tracking area identity, TAI), or may be other information that can be used to uniquely indicate the tracking area. This is not limited in this application. For ease of description, the following uses an example in which the TAI is used as the indication information of the tracking area for description. However, this shall not constitute any limitation on this application. For example, the service area list in the registration accept message includes an allowed type (allowed type) field and a type of list (type of list) field. When the type of list field is "11", it may indicate that all tracking areas in the PLMN with which the terminal device currently registers are allowed areas. When the allowed type field is "0", it may indicate that all tracking areas in the service area list are allowed areas. When the allowed type field is "1", it may indicate that all tracking areas in the service area list are non-allowed areas.

The service area list may further include indications of a plurality of TAIs. In an implementation, the TAI may include three parts: a mobile country code (mobile country code, MCC), a mobile network code (mobile network code, MNC), and a tracking area code (tracking area code, TAC). In other words, a combination of the MCC, the MNC, and the MAC may be used to determine a TAI.

Therefore, if the type of list field in the service area list received by the terminal device is not "11", and the allowed type field is "0", the terminal device may determine that a tracking area corresponding, to an indication of one or more TAIs included in the service area list belongs to the allowed area. If the type of list field in the service area list received by the terminal device is not "11", and the allowed type field is "1", the terminal device may determine that the tracking area corresponding to the indication of one or more TAIs included in the service area list belongs to the non-allowed area.

Each tracking area may include one or more cells, and geographical locations of the tracking areas do not overlap each other. The allowed area may include one or more tracking areas. The non-allowed area may also include one or more tracking areas. This is not limited in this application.

It should be understood that the method in which the service area list is carried in the registration request message to indicate the allowed area or the non-allowed area is merely an example, and shall not constitute any limitation on this application. For example, the service area list may be further carried in a configuration update command message (configuration update command message). Specific signaling used to carry the service area list is not limited in this application.

It should be further understood that for a specific manner in which the network device indicates the allowed area or the non-allowed area by using the service area list, refer to related descriptions in the 3GPP protocol TS24.501. For brevity, this is not limited herein. In addition, a specific indication manner of the allowed area and the non-allowed area is not limited in this application.

It should be noted that in this embodiment of this application, the allowed area (or the non-allowed area) may include one or more tracking areas, and each tracking area may include one or more cells. Therefore, when a tracking area is described, it may be considered that the tracking area is one of the tracking areas included in the allowed area (or the non-allowed area). In other words, it may be considered that the tracking area belongs to the allowed area (or the non-allowed area), or it may be considered that the tracking area is the allowed area (or the non-allowed area).

Similarly, when a cell is described, it may be considered that the cell is one of the cells included in the allowed area (or the non-allowed area). In other words, it may be considered that the cell belongs to the allowed area (or the non-allowed area), or it may be considered that the cell is the allowed area (or the non-allowed area). In step 440, the terminal device determines that a cell with which the terminal device currently registers is a non-allowed area.

The terminal device may determine, based on a TAI of a tracking area to which the cell with which the terminal device currently registers belongs, whether the cell with which the terminal device currently registers is a non-allowed area. Herein, each cell may belong to one tracking area, and corresponds to one TAI. Therefore, for ease of description in the following, the TAI of the tracking area of the cell is denoted as a TAI of the cell. It may be understood that because one tracking area may include one or more cells, cells in a same tracking area correspond to a same TAI.

As described above, if the terminal device receives the service area list, the terminal device may determine whether the terminal device is in the service area restriction state. Then, the terminal device may further determine, based on the service area list and the tracking area to which the cell with which the terminal device currently registers belongs, whether the terminal device is currently in the non-allowed area.

In an implementation, the non-access stratum in the terminal device may determine, based on a TAI of the cell with which the terminal device currently registers and the service area restriction, whether the cell with which the terminal device currently registers belongs to the non-allowed area.

Specifically, the RRC layer in the terminal device may obtain the TAI by receiving a broadcast message of the cell, and report the TAI to the non-access stratum. The non-access stratum may determine, with reference to the TAI and a pre-received service area list, for example, the service area list carried in the registration accept message received in step 430, whether the cell with which the terminal device currently registers is the non-allowed area. For example, when the allowed area is indicated in the service area list, if the TAI is in a tracking area included in the allowed area, it is determined that the terminal device is in the allowed area; and if the TAI is not in the tracking area included in the allowed area, it is determined that the terminal device is in the non-allowed area. When the non-allowed area is indicated in the service area list, if the TAI is in a tracking area included in the non-allowed area, it is determined that the terminal device is in the non-allowed area; and if the TAI is not in the tracking area included in the non-allowed area, it is determined that the terminal device is in the allowed area.

It should be understood that determining, based on the TAI of the cell with which the terminal device currently registers, whether the terminal device is in the non-allowed area is merely a possible implementation, and this shall not constitute any limitation on this application. The terminal device may determine, by using a method in the conventional technology, whether the terminal device is in the non-allowed area. A specific implementation of determining, by the terminal device, whether the terminal device is in the non-allowed area is not limited in this application.

It should be further understood that FIG. 4 is merely an example, and schematically shows an example in which the non-access stratum determines, based on the TAI of the cell with which the terminal device currently registers, whether the terminal device is in the non-allowed area. However, this shall not constitute any limitation on this application. This application does not exclude a possibility that another layer, for example, the RRC layer, in the terminal device determines whether the terminal device is in the non-allowed area.

In step 450, the non-access stratum in the terminal device sends, to the application layer, a notification of successful registration of the 5G network.

It should be understood that step 450 may be performed before step 440, or may be performed after step 440 or step 460, or may be performed simultaneously with step 440 or step 460. This is not limited in this application. FIG. 4 is merely an example, and shall not constitute any limitation on this application.

In step 460, the application layer displays a 5G icon in a user interface, to prompt a user that the terminal device currently works in a 5G standard.

Afterwards, the terminal device keeps working in the 5G standard. If the user does not actively initiate a service, both the application layer and the non-access stratum are in a state in which no service is actively initiated. In addition, the terminal device always stays in the non-allowed area.

However, the application layer does not perceive that the terminal device is in the non-allowed area. A 5G signal is still displayed in the user interface. The user cannot use a 5G access technology to make a call, send an SMS message, or browse a web page in the non-allowed area. Therefore, user experience is poor.

In view of this, this application provides a network search method, to improve user experience. Before the embodiment of this application is described, several concepts in this application are first described briefly.

1. Radio access technology (radio access technology, RAT): The RAT may also be referred to as a radio standard, namely, a type of a network. Current RATs may mainly include: a $2^{nd}$ generation (2G) access technology, a $2.5^{th}$ generation (2.5G) access technology, a $3^{rd}$ generation (3G) access technology, a $4^{th}$ generation (4G) or referred to as long term evolution (Long Term Evolution, LTE) access technology, and a $5^{th}$ generation (5G) access technology. 2G can be represented by GSM; 3G can be represented by CDMA of China Telecom, time division-synchronous code division multiple access (Time Division-Synchronous Code Division Multiple Access, TD-SCDMA) of China Mobile, and WCDMA of China Unicom; and 4G can be represented by time division long term evolution (Time Division LTE, TD-LTE) of China Mobile and frequency division duplexing LTE (Frequency Division Duplexing LTE, FDD-LTE) of China Telecom and China Unicom.

Because different RATs have different baseband signal processing manners, instructions used for baseband processing in different RATs may also be different.

2. Non-access stratum (NAS) and access stratum: From a perspective of a protocol stack, a protocol layer may be divided into an access stratum (access stratum, AS) and a non-access stratum.

The access stratum is mainly responsible for a procedure between an access network and a terminal device. For example, in LTE and 5G, the access stratum may specifically include a radio resource control (radio resource control, RRC) layer, a packet data convergence protocol (packet data convergence protocol, PDCP) layer, a radio link control (radio link control, RLC) layer, and a media access control (media access control, MAC) layer, a physical layer, and the like. It should be understood that the protocol layers, listed herein, specifically included in the access stratum are merely examples, and shall not constitute any limitation on this application. This application does not exclude a possibility of modifying, in a future protocol, the protocol layers included in the access stratum.

The non-access stratum is mainly responsible for a procedure between a core network and the terminal device. This embodiment of this application mainly relates to the procedure of the non-access stratum.

The procedure of the non-access stratum is a signaling procedure that needs to be processed only between the terminal device and the core network, and a radio access network may not process signaling of the non-access stratum. In other words, the radio access network may directly forward signaling from the core network to the terminal device, or may directly forward signaling from the terminal device to the core network.

The procedure of the non-access stratum mainly includes mobility management in a circuit domain, call control in the circuit domain, mobility management in a packet domain, session management in the packet domain, and the like. A non-access stratum protocol is used to process information transmission between the terminal device and the core network, and transmitted content may be user information or control information, for example, information about establishment, release, or mobility management of a service.

The non-access stratum may include mobility management (mobility management, MM), session management (session management, SM), call control (call control, CC), a short message service (short message service, SMS), and the like.

It should be noted that the non-access stratum and the access stratum are merely used for different functions, and may be implemented by using a same processor, for example, modules configured to execute different programs in a same processor, or may be implemented by using two processors that are independent of each other. This is not limited in this application. The non-access stratum and the access stratum may be jointly configured to implement a function of a communication processor, and communicate with the network device based on a service request of an application layer, to implement a corresponding service of the application layer.

The following describes in detail a network search method and a terminal device provided in the embodiments of this application with reference to the accompanying drawings.

It should be understood that the network search method provided in the embodiments of this application may be performed by the terminal device, and specifically relates to interaction between a communication processor and an application processor in the terminal device and interaction between the communication processor and an external network. The communication processor may include an access stratum and a non-access stratum. The following directly describes a specific protocol layer when steps performed by the access stratum or the non-access stratum are described. However, a person skilled in the art may understand that all steps performed by the protocol layers may be implemented by the communication processor by executing programs including corresponding code. In addition, the protocol layers included in the access stratum are described in detail above. For brevity, details are not described herein again.

It should be further understood that a specific structure of an execution body of the method provided in the embodiments of this application is not particularly limited in the following embodiments, provided that communication can be performed according to the method provided in the embodiments of this application by running a program that records code of the method provided in the embodiments of this application.

Figure 5:
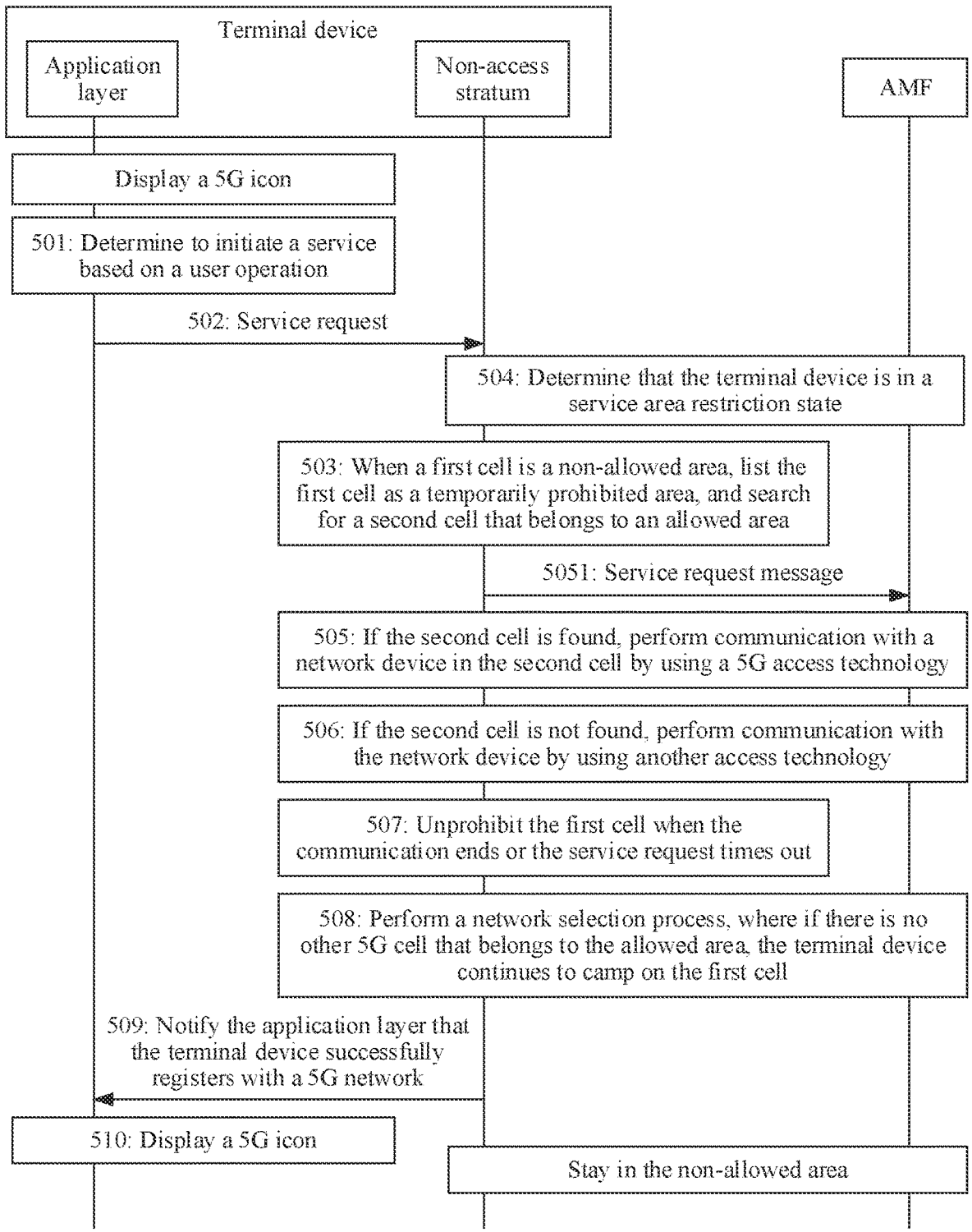
FIG. 5 is a schematic flowchart of a network search method according to an embodiment of this application.

FIG. 5 shows a schematic flowchart of a network search method 500 from a perspective of device interaction according to an embodiment of this application. As shown in the figure, the method 500 may include step 501 to step 510. The following describes the steps in the method 500 in detail.

For example, a terminal device may register with a 5G cell according to the procedure described above with reference to FIG. 4, and display a 5G icon in a user interface by using an application layer.

In step 501, the terminal device receives a user operation, where the user operation requests communication with a network device by using a 5G access technology.

A user can actively initiate a service by performing an operation in a user interface of the terminal device. For example, the user interface of the terminal device is operated to make a call, open a browser to browse a web page, or send information. The application layer can initiate a corresponding service based on the user operation.

Optionally, the method further includes step 502: The application layer may send a service request to a non-access stratum, where the service request is used to request communication with the network device by using the 5G access technology. Correspondingly, the non-access stratum receives the service request from the application layer.

To improve user experience, the terminal device preferentially selects to work in a 5G standard. In other words, the terminal device preferentially uses the 5G access technology to communicate with the network device. As described above, after being powered on, the terminal device may search for a 5G cell through cell search. If a 5G cell is found, the terminal device may preferentially register with a 5G network. If the terminal device successfully registers with the 5G network, the NAS may notify the application layer, and the application layer may display, in the user interface, an icon indicating a normal 5G service. When the application layer determines, based on the user operation, that a service needs to be initiated, the application layer may send a service request to the non-access stratum, to request communication with the network device by using the 5G access technology.

In step 503, when the cell with which the terminal device currently registers is a non-allowed area, the terminal device searches for a cell that belongs to an allowed area.

For ease of differentiation and description, in this embodiment, the cell with which the terminal device currently registers is denoted as a first cell, and a cell that is searched for by the terminal device and that belongs to the allowed area is denoted as a second cell. The first cell belongs to the non-allowed area. To be specific, a TA of the first cell is within a range of the non-allowed area. The second cell belongs to the allowed area. To be specific, a TA of the second cell is within a range of the allowed area.

The non-allowed area may include one or more TAs, and each TA includes one or more cells. Therefore, the non-allowed area may include one or more cells. Similarly, the allowed area may also include one or more TAs, and each TA may also include one or more cells. Therefore, the allowed area may include one or more cells.

It may be understood that both the first cell and the second cell are 5G cells.

In a possible implementation, the non-access stratum may trigger an RRC layer to search for a cell that belongs to the allowed area.

Specifically, the non-access stratum may first determine whether the first cell is a non-allowed area, and may trigger, when determining that the first cell is a non-allowed area, the RRC layer to search for the second cell.

A specific method for determining, by the terminal device based on a TAI of the cell with which the terminal device currently registers and a service area restriction in a service area list, whether the terminal device is in the non-allowed area is described in detail above. For brevity, details are not described herein again. The service area restriction may be the allowed area or the non-allowed area indicated in the service area list described above.

As described above, the service area restriction may be configured by using existing signaling. Optionally, before step 503, the method 500 further includes step 504: The terminal device determines that the terminal device is in a service area restriction state.

Specifically, the non-access stratum may receive, from an access network device, a service area restriction from an AMF. For example, the service area restriction may be carried in a service area list in a registration request message or a configuration update command message.

The foregoing has described in detail, with reference to FIG. 4, a specific process of receiving the service area restriction and how to indicate the service area restriction in a registration process of the terminal device. For brevity, details are not described herein again.

It should be understood that FIG. 5 schematically shows a case in which step 504 is performed between step 502 and step 503. However, this shall not constitute any limitation on this application. Step 504 may be performed before step 502 or step 501, or may be performed after step 501 or step 502, or may be performed simultaneously with step 501 or step 502. This is not limited in this application.

After receiving the service area restriction, the non-access stratum may determine, based on a TAI of the first cell, whether the first cell belongs to the non-allowed area. When the first cell belongs to the non-allowed area, the non-access stratum may trigger the RRC layer to perform cell selection, to search for the second cell that belongs to the allowed area. When the first cell belongs to the allowed area, the non-access stratum may actively initiate normal communication with the network based on the service request from the application layer. If the non-access stratum does not receive the service area restriction, it may be considered that the first cell with which the terminal device currently registers belongs to the allowed area, and the normal communication with the network may be initiated. This embodiment of this application mainly provides a network search method when the terminal device is in the non-allowed area. A case in which the terminal device is in the allowed area is not described in this application. Therefore, an operation performed when the terminal device is in the allowed area is not limited.

It should be understood that configuring the service area restriction by using the registration request message or the configuration update command message is merely a possible implementation, and specific signaling and a specific manner of configuring the service area restriction for the network device are not limited in this application.

In a possible implementation, the non-access stratum may notify, through PLMN selection, the RRC layer to perform cell selection. The RRC layer may attempt to receive a broadcast message of another 5G cell other than the first cell. For example, the RRC layer may attempt to receive a broadcast message of a neighboring cell of the first cell. For example, there are a cell #1, a cell #2, and a cell #3 around the first cell. The RRC layer may obtain TAIs of the cell #1, the cell #2, and the cell #3 based on broadcast messages received respectively in the cell #1, the cell #2, and the cell #3, and report the TAIs to the non-access stratum. The non-access stratum may search, based on the TAI of each cell and the service area restriction, for the second cell that belongs to the allowed area.

The RRC layer may receive a broadcast message from another cell other than the first cell by using an existing cell selection procedure. For example, the RRC layer may sequentially receive broadcast messages from one or more of the cell #1, the cell #2, and the cell #3 based on quality of a signal received by the terminal device. The non-access stratum may determine, based on the TAI of each cell, whether one or more of the cell #1, the cell #2, and the cell #3 are non-allowed areas. For example, if the terminal device receives a signal with the best quality from the cell #1, the terminal device may preferentially determine whether the cell #1 belongs to the non-allowed area. If the cell belongs to the non-allowed area, the terminal device may continue to determine whether a cell with the second highest signal quality, for example, the cell #2, belongs to the non-allowed area. If the cell does not belong to the non-allowed area, the cell #1 may be used as the second cell.

Because there may be a plurality of 5G cells around the first cell, the non-access stratum may repeatedly determine whether a same cell is a non-allowed area. To prevent the terminal device from repeatedly determining whether a same cell is a non-allowed area for a plurality of times, the non-access stratum may record a cell that is determined as a non-allowed area. Optionally, the non-access stratum adds a cell identifier of the cell that is determined as a non-allowed area and/or a TAI of the cell to a temporary prohibition list. All TAs corresponding to TAIs recorded in the temporary prohibition list may be temporarily prohibited areas. The terminal device in a temporarily prohibited area is prohibited from initiating communication.

For example, the RRC layer first records, in the temporary prohibition list, a cell identity of the cell (namely, the first cell) with which the terminal device currently registers. Then, the RRC layer may sequentially receive the broadcast messages from one or more of the cell #1, the cell #2, and the cell #3 based on the quality of the signal received by the terminal device. The non-access stratum may determine, based on the TAI of each cell, whether one or more of the cell #1, the cell #2, and the cell #3 are non-allowed areas. For example, if the terminal device receives a signal with the best quality from the cell #1, the terminal device may preferentially determine whether the cell #1 belongs to the non-allowed area. If the cell #1 belongs to the non-allowed area, the cell identity of the cell #1 and a corresponding TAI may be recorded in the temporary prohibition list. The rest may be deduced by analogy until a cell that belongs to the allowed area is found.

If no record is made, the terminal device may usually preferentially select a cell with relatively good signal quality to determine whether the cell belongs to the allowed area. Therefore, after determining that the cell #2 belongs to the non-allowed area, the terminal device may determine again whether the cell #1 with relatively good signal quality belongs to the allowed area. Therefore, it may take the terminal device a relatively long time to search for the second cell that belongs to the allowed area. However, if a cell that has been determined is recorded, the terminal device can be prevented from repeatedly determining a same cell. This helps the terminal device quickly find the second cell.

For another example, the RRC layer may first record, in the temporary prohibition list, the TAI (for ease of description, denoted as, for example, a TAI #1) of the cell (namely, the first cell) with which the terminal device currently registers. Then, the terminal device may exclude, based on a received broadcast message of each cell, all cells that have a same TAI as the first cell. Then, based on signal quality, the terminal device selects a cell in a tracking area other than a tracking area corresponding to the TAI #1 to determine whether the cell belongs to the allowed area. For example, if a cell determined next time also belongs to the non-allowed area, the RRC layer may also record a TAI (for ease of description, denoted as, for example, a TAI #2) of the cell in the temporary prohibition list. Then, the terminal device may exclude, based on the received broadcast message of each cell, all cells included in a tracking area corresponding to the TAI #2. The rest may be deduced by analogy until a cell that belongs to the allowed area is found.

If no record is made, the terminal device may usually preferentially select a cell with relatively good signal quality to determine whether the cell belongs to the allowed area. Therefore, after determining the cells included in the tracking area corresponding to the TAI #2, the terminal device may determine again whether the cell #1 with relatively good signal quality belongs to the allowed area. Therefore, it may take the terminal device a relatively long time to search for the second cell that belongs to the allowed area. However, if a cell that has been determined is recorded, the terminal device can be prevented from repeatedly determining a same cell. This helps the terminal device quickly find the second cell.

Certainly, the terminal device may also record, in the temporary prohibition list, both a cell determined as a non-allowed area and a corresponding tracking area. This is not limited in this application. That is, the temporary prohibition list may include one or more cells, and/or tracking areas to which the one or more cells belong respectively.

It should be noted that the temporary prohibition list herein may be determined by the terminal device. The cell or tracking area recorded in the temporary prohibition list may be referred to as a temporarily prohibited area. Because a tracking area may be understood as a set of cells, it may also be considered that all cells recorded in the temporary prohibition list are temporarily prohibited areas. The terminal device may also delete, from the temporary prohibition list at any time, a cell or a tracking area that is listed as a temporarily prohibited area, in other words, unprohibit the cell or the tracking area that is listed as a temporarily prohibited area. The temporary prohibition list and the temporarily prohibited area are terms defined for ease of understanding in the embodiments of this application, and shall not constitute any limitation on this application. For example, the temporary prohibition list may also be referred to as a temporary list.

If the non-access stratum finds the second cell in step 503, step 505 may be performed, and the terminal device communicates with the network device in the second cell by using the 5G access technology. If the non-access stratum does not find the second cell in step 503, step 506 may be performed, and the terminal device may communicate with the network device by using another radio access technology.

In step 505, the terminal device communicates with the network device in the second cell.

Specifically, the terminal device may request to access the second cell, and communicate with the network device in the second cell.

For example, the terminal device may send a registration request message (registration request message) or a service request message (service request message) to the AMF the second cell by using the non-access stratum, to communicate with the network device. Correspondingly, the AMF receives the registration request message from the terminal device.

The registration request message may be specifically sent based on a mobility registration procedure. The non-access stratum may request, by initiating the mobility registration procedure, to camp on the second cell, or request to access the second cell. When the mobility registration procedure is triggered by the foregoing service request, the registration request message may carry a flag bit to indicate that there is a service subsequently.

Optionally, the method 500 further includes step 5051: The terminal device sends the service request message to the AMF in the second cell, to request to communicate with the network device. Specifically, the terminal device may alternatively directly send, in the second cell, a service request (service request) to the AMF by using the non-access stratum, to request to communicate with the network device. Correspondingly, the AMF receives the service request.

It should be understood that, that the terminal device communicates with the network device in the second cell by initiating a mobility registration procedure, a service request, or the like is merely two possible implementations, and shall not constitute any limitation on this application. The terminal device may also access the second cell in another manner, and communicate with the network device in the second cell. This is not limited in this application.

It should be noted that step 5051 may also be understood as a procedure in step 505. The terminal device may initiate a service request to implement normal communication with the network device. The figure is merely an example, and step 505 and step 5051 are separately used as examples. The two steps shown in the figure shall not constitute any limitation on an execution sequence of the terminal device. In fact, step 506 shown later may also include the procedure of step 5051. For brevity, this is not repeatedly shown in the figure.

In addition, after accessing the second cell, the terminal device may camp on the second cell. Based on this, when receiving a next service request, the non-access stratum may directly communicate with the network device in the second cell by using the 5G access technology, and does not need to repeat the foregoing network search process. Therefore, user experience can be improved.

In step 506, the terminal device communicates with the network device by using any one of a 4G access technology, a 3G access technology, a 2.5G access technology, or a 2G access technology.

To ensure normal communication for the user, the terminal device may select another radio access technology to communicate with the network device when the 5G access technology cannot be used. For example, the terminal device may preferentially select the 4G access technology, then the 3G access technology, then the 2.5G access technology, the 2G access technology, and the like. Alternatively, the terminal device may communicate with the network device by using any one of the 4G access technology, the 3G access technology, the 2.5G access technology, or the 2G access technology.

Specifically, if the non-access stratum does not find the second cell that belongs to the allowed area, the non-access stratum may trigger the RRC layer to select an appropriate cell to camp on, and then communicates, by using a corresponding radio access technology, with the network device in the cell on which the non-access stratum camps. For example, the RRC layer may preferentially search for a 4G cell, and when the 4G cell is found, may access the 4G cell through an initial access procedure. After accessing the 4G cell, the terminal device may communicate with the network device in the 4G cell by using the 4G access technology.

It should be understood that, that the terminal device communicates with the network device may specifically include: An application processor communicates with the network device by using a communication processor. For a specific process, refer to the conventional technology. For brevity, a detailed description of the specific process is omitted in this specification. The specific process of the communication between the terminal device and the network device is not limited in this application. It should be understood that FIG. 5 schematically shows step 505 and step 506, but it does not indicate that the non-access stratum needs to perform step 505 and step 506. The terminal device may choose to perform step 505 or step 506 based on a case of searching for the second cell in step 503. Regardless of performing step 505 or step 506, the terminal device in this case can normally communicate with the network device.

Optionally, after step 506, the method further includes step 507: After the communication between the terminal device and the network device ends, or when the service request times out, unprohibit one or more cells including the first cell and/or one or more tracking areas including a tracking area to which the first cell belongs from the temporary prohibition list.

When the terminal device does not find the second cell that belongs to the allowed area, the terminal device communicates with the network device by using another access technology. When the communication is completed or the service request times out, the terminal device may return to the 5G standard, to obtain better user experience. Therefore, in the first cell, the terminal device may respond to paging from an access network or a core network, or may initiate mobility registration, but cannot actively initiate communication with the network device.

In this case, the non-access stratum may unprohibit the first cell from the temporarily prohibited area, so that the first cell is restored to the non-allowed area. The terminal device may still work in the 5G standard in the first cell. A possible implementation of unprohibiting the first cell from the temporarily prohibited area may be deleting the first cell from the temporary prohibition list.

It should be understood that the non-access stratum is not limited to deleting the first cell from the temporary prohibition list. The non-access stratum may delete, from the temporary prohibition list, one or more cells (including the first cell) and/or one or more tracking areas (including the tracking area to which the first cell belongs) that are recorded in the temporary prohibition list.

Optionally, the method further includes step 508: Execute a network selection procedure again.

After a previous service ends, for example, communication ends or a service times out, the terminal device may perform a network selection procedure again to search for a third cell that belongs to the allowed area.

For ease of differentiation and description, a cell that is found by the terminal device after the previous service ends and that belongs to the allowed area is denoted as the third cell herein. Due to mobility of the terminal device, the third cell and the second cell may be a same cell, or may be different cells. This is not limited in this application.

For example, the terminal device may enter an idle mode after receiving an RRC connection release (RRC connection release) message from the AMF. The terminal device in the idle state may periodically scan another 5G cell other than the first cell, to search for a 5G cell that belongs to the allowed area.

A specific process in which the terminal device scans the another 5G cell other than the first cell each time to search for the third cell that belongs to the allowed area may be the same as the specific process in which the RRC layer searches for the second cell that belongs to the allowed area in step 502. For brevity, details are not described herein again.

Optionally, the method further includes: When the third cell is found, initiate mobility registration to request to camp on the third cell.

If the RRC layer finds the third cell that belongs to the allowed area, the RRC layer may report the third cell to the non-access stratum. The non-access stratum may send a registration request message to the AMF based on the mobility registration procedure, to request to camp on the third cell. If the non-access stratum further receives a registration accept message from the AMF, it may be considered that the terminal device accesses the third cell, in other words, the terminal device enters the allowed area, and is no longer limited by normal communication. Therefore, user experience is improved. A specific process of moving the terminal device to the third cell is described in detail below with reference to FIG. 4. For brevity, detailed description of the specific process is omitted herein.

If the RRC layer does not find the third cell that belongs to the allowed area, the terminal device may continue to camp on the first cell, in other words, be located in the non-allowed area.

The non-access stratum may notify, in step 509, the application layer again that the registration with the 5G network succeeds. Thereafter, the application layer displays the 5G icon again in the user interface in step 510. The terminal device may continue to stay in the non-allowed area.

Based on the foregoing technical solution, when determining that the terminal device is in the non-allowed area, the terminal device may actively search for a cell that belongs to the allowed area, for example, the second cell. When the second cell is found, the terminal device communicates with the network device in the second cell; and when the second cell is not found, the terminal device communicates with the network device by using another radio access technology other than the 5G radio access technology. In this way, a case in which the terminal device cannot communicate with the network device in the non-allowed area can be avoided, and this helps improve user experience.

Figure 6:
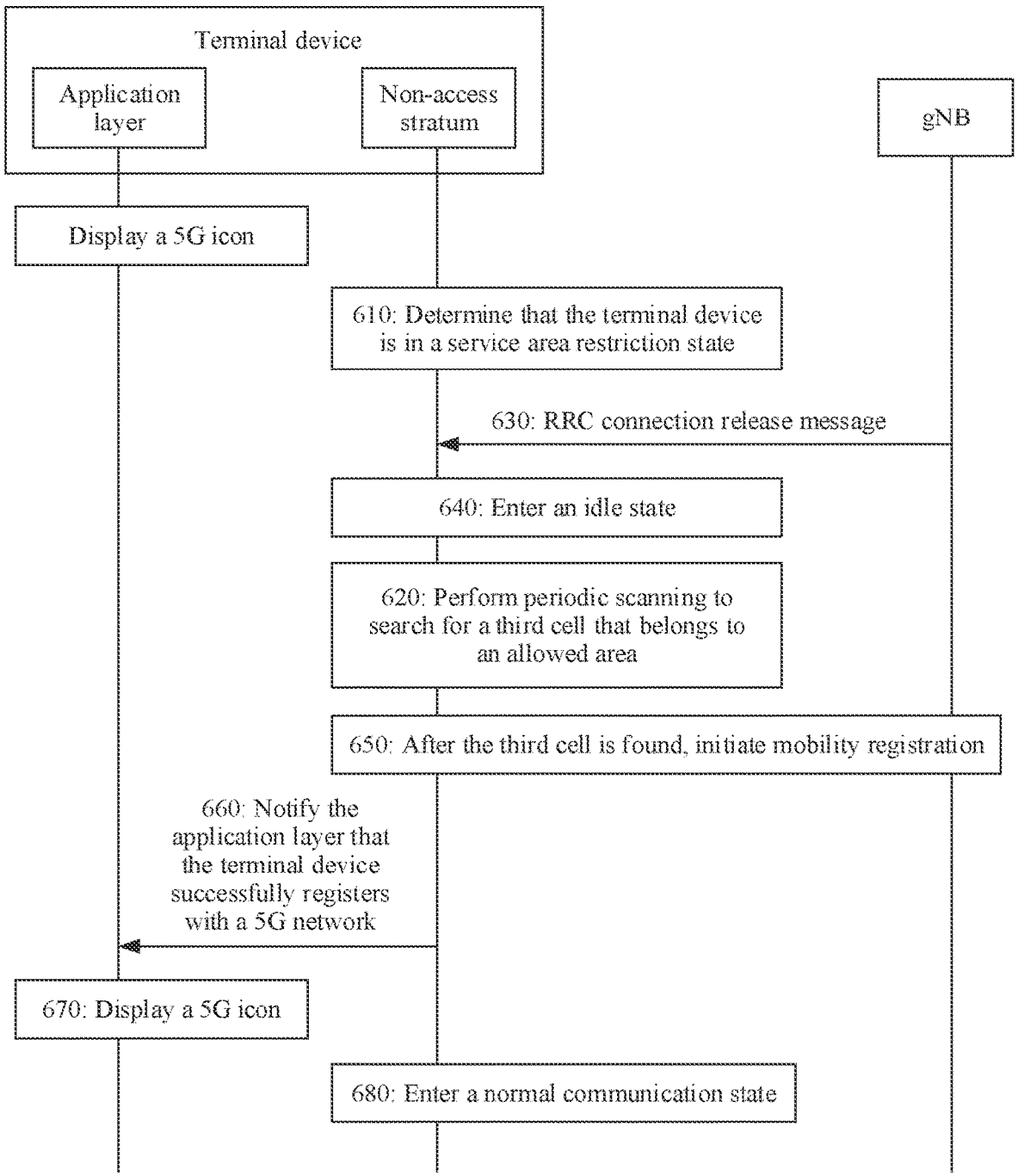
FIG. 6 is a schematic flowchart of a network search method according to another embodiment of this application.

FIG. 6 shows a schematic flowchart of a network search method 600 of a terminal device from a perspective of device interaction according to another embodiment of this application. As shown in the figure, the method 600 includes step 610 to step 680.

For example, a terminal device may register with a 5G cell according to the procedure described above with reference to FIG. 4, and display a 5G icon in a user interface by using an application layer.

In step 610, the terminal device determines that the terminal device is in a service area restriction state. After completing 5G network registration, the terminal device, specifically a non-access stratum in the terminal device, may determine, based on a received service area list, that the terminal device is in the service area restriction state. In addition, the terminal device may further determine, based on the service area list, that a first cell with which the terminal device current registers is a non-allowed area. A specific method for determining, by the non-access stratum, whether the first cell is a non-allowed area is described in detail in the foregoing method 400. For brevity, details are not described herein again.

When the terminal device determines that the first cell belongs to a non-allowed area, the non-access stratum determines that the terminal device enters a communication-restricted state. In this way, the terminal device enters the communication-restricted state. The terminal device can only initiate an emergency call or mobility registration in the first cell by using a 5G access technology, or receive a paging message from a core network or an access network, but cannot actively initiate another service.

In step 620, the terminal device searches for a third cell that belongs to an allowed area.

To improve user experience, after entering an idle mode, the terminal device may actively search for the third cell that belongs to the allowed area. Specifically, after determining that the terminal device enters the idle mode, an RRC layer in the terminal device may actively search for the third cell that belongs to the allowed area.

Optionally, before step 620, the method 600 further includes step 630: The terminal device receives an RRC connection release message from an access network device (for example, the gNB shown in the figure). Correspondingly, the gNB sends the RRC connection release message to the terminal device.

The RRC layer of the terminal device may determine, based on the received RRC connection release message, that the terminal device enters the idle mode. The terminal device may further perform step 640, to enter the idle mode. In addition, the RRC layer may report, to the non-access stratum, that the terminal device enters the idle mode.

Optionally, step 620 specifically includes: The terminal device periodically scans one or more cells other than the first cell, to search for the third cell.

The terminal device, specifically the RRC layer in the terminal device, may periodically scan one or more cells other than the first cell. For example, a scanning period may be predefined, for example, defined in a protocol, or determined by the terminal device. This is not limited in this application.

Certainly, the terminal device may alternatively periodically scan one or more tracking areas other than a tracking area corresponding to the first cell, to search for the third cell that belongs to the allowed area. Each time the terminal device performs scanning, the terminal device may perform scanning by using a cell as a unit. To be specific, as described in the foregoing method 500, whether a cell or a tracking area to which the cell belongs is an allowed area is determined based on a TAI of the cell in a broadcast message. Therefore, an essence of periodically scanning a tracking area by the terminal device may also be understood as periodically scanning a cell.

A specific process in which the terminal device searches for the third cell that belongs to the allowed area may be the same as the specific process in which the terminal device searches for the second cell that belongs to the allowed area in step 503 in the foregoing method 500. For brevity, details are not described herein again. In step 650, after finding the third cell, the terminal device initiates mobility registration.

The terminal device may request to camp on the third cell by initiating the mobility registration. Specifically, if the RRC layer finds the third cell that belongs to the allowed area, the RRC layer may report the third cell to the non-access stratum. The non-access stratum may send a registration request message to an AMF based on a mobility registration request procedure, to request to camp on the third cell. If the AMF allows the terminal device to access the third cell, the non-access stratum may receive a registration accept message from the AMF.

If the non-access stratum receives the registration accept message from the AMF, it may be considered that the terminal device is allowed to access the third cell. Optionally, in step 660, the non-access stratum notifies the application layer that the terminal device successfully registers with a 5G network. Thereafter, the application layer may display the 5G icon in the user interface in step 670. The terminal device may enter a normal communication state in step 680.

After the terminal device enters the third cell, because the third cell belongs to the allowed area, the non-access stratum determines that the terminal device enters the normal communication state. In other words, the terminal device can normally communicate with the network device in the third cell by using the 5G access technology without restriction.

Based on the foregoing technical solution, when determining that the terminal device is in the non-allowed area, the terminal device may actively search for a cell that belongs to the allowed area, for example, the third cell, and when finding the third cell, the terminal device may initiate a mobility registration procedure, to request to camp on the third cell. Therefore, the terminal device enters the allowed area, normal communication can be restored, and the terminal device is no longer restricted by the non-allowed area. User experience is improved.

The network search method provided in the embodiments of this application is described above in detail with reference to FIG. 5 to FIG. 6. The terminal device provided in the embodiments of this application is described below in detail with reference to FIG. 7 and FIG. 8.

Figure 7:
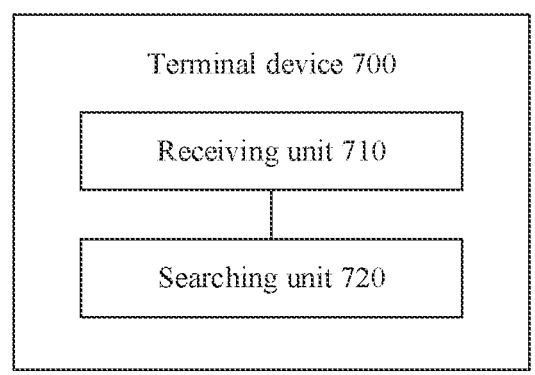
FIG. 7 and FIG. 8 are schematic diagrams of compositions of terminal devices according to embodiments of this application.

When each function module is obtained through division based on each corresponding function, FIG. 7 is a schematic diagram of a possible composition of the terminal device 700 in the foregoing embodiments. As shown in the figure, the terminal device 700 may include a receiving unit 710 and a searching unit 720.

Specifically, the terminal device 700 may be corresponding to the terminal device in the method 500 in the embodiments of this application. The terminal device 700 may include units configured to perform the method performed by the terminal device in the method 500 in FIG. 5. In addition, the units in the network device 700 and the foregoing other operations and/or functions are separately used to implement corresponding procedures of the method 500 in FIG. 5.

When the terminal device 700 is configured to perform the method 500 in FIG. 5, the receiving unit 710 may be configured to perform step 501 in the method 500 and/or another process of the technology described in this specification. The searching unit 720 may be configured to perform step 503 in the method 500, and/or another process of the technology described in this specification. It should be understood that a specific process in which the units perform the foregoing corresponding steps is described in detail in the foregoing method embodiments. For brevity, details are not described herein again.

It should be noted that all related content of the steps in the foregoing method embodiments may be cited in function descriptions of corresponding function modules. Details are not described herein again.

The terminal device provided in this embodiment is configured to perform the foregoing network search method 600. Therefore, an effect same as the effect of the foregoing implementation methods can be achieved.

When an integrated unit is used, the terminal device may include a processing unit, a storage unit, and a communications unit. The processing unit may be configured to control and manage an action of the terminal device, for example, may be configured to support the terminal device in performing the steps performed by the receiving unit 710 and the searching unit 720. The storage unit may be configured to support the terminal device in storing program code, data, and the like. The communications unit may be configured to support communication between the terminal device and another device.

Figure 8:
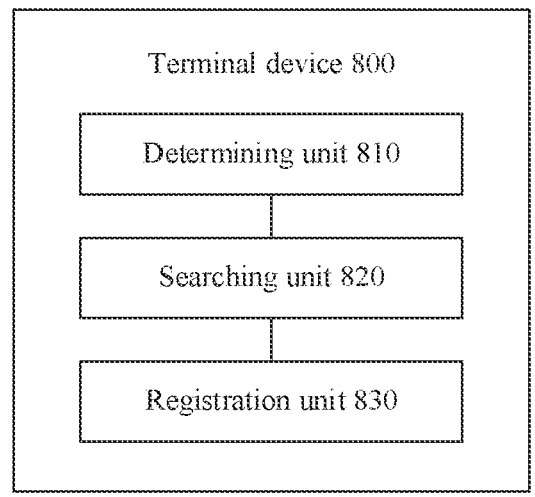

When each function module is obtained through division based on each corresponding function, FIG. 8 is a schematic diagram of a possible composition of the terminal device 800 in the foregoing embodiments. As shown in the figure, the terminal device 800 may include a determining unit 810, a searching unit 820, and a registration unit 830.

Specifically, the terminal device 800 may be corresponding to the terminal device in the method 600 in the embodiments of this application. The terminal device 800 may include units configured to perform the method performed by the terminal device in the method 600 in FIG. 6. In addition, the units in the network device 800 and the foregoing other operations and/or functions are separately used to implement corresponding procedures of the method 600 in FIG. 6.

When the terminal device 800 is configured to perform the method 600 in FIG. 6, the determining unit 810 may be configured to perform step 610 in the method 600 and/or another process of the technology described in this specification. The searching unit 820 may be configured to perform step 620 in the method 600, and/or another process of the technology described in this specification. The registration unit 830 may be configured to perform step 650 in the method 600, and/or another process of the technology described in this specification. It should be understood that a specific process in which the units perform the foregoing corresponding steps is described in detail in the foregoing method embodiments. For brevity, details are not described herein again.

It should be noted that all related content of the steps in the foregoing method embodiments may be cited in function descriptions of corresponding function modules. Details are not described herein again.

The terminal device provided in this embodiment is configured to perform the foregoing network search method 800. Therefore, an effect same as the effect of the foregoing implementation methods can be achieved.

When an integrated unit is used, the terminal device may include a processing unit, a storage unit, and a communications unit. The processing unit may be configured to control and manage an action of the terminal device, for example, may be configured to support the terminal device in performing the steps performed by the determining unit 810, the searching unit 820, and the registration unit 830. The storage unit may be configured to support the terminal device in storing program code, data, and the like. The communications unit may be configured to support communication between the terminal device and another device.

It should be understood that the processing units in the foregoing terminal device 700 and terminal device 800 may be processors or controllers. The processing units may implement or execute various example logical blocks, modules, and circuits described with reference to content disclosed in this application. Alternatively, the processor may be a combination of processors implementing a computing function, for example, a combination of one or more microprocessors, or a combination of a digital signal processor (digital signal processing, DSP) and a microprocessor. The storage unit may be a memory. The communications unit may be specifically a device that interacts with another terminal device, for example, a radio frequency circuit, a Bluetooth chip, or a Wi-Fi chip.

In an embodiment, when the processing unit is a processor and the storage unit is a memory, the terminal device in this embodiment may be an electronic device having the structure shown in FIG. 1.

An embodiment further provides a computer storage medium. The computer storage medium stores computer instructions. When the computer instructions are run on a terminal device, the terminal device is enabled to perform the foregoing related method steps, to implement the network search method in the foregoing embodiments.

An embodiment further provides a computer program product. When the computer program product runs on a computer, the computer is enabled to perform the foregoing related steps, to implement the network search method in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to enable the chip to perform the network search method in the foregoing method embodiments.

The terminal device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it shall not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving a user operation in a user interface of a terminal device requesting communication with a network device by using a $5^{th}$ Generation (5G) access technology; and
    searching, in response to the user operation in the user interface of the terminal device, for a second cell comprising an allowed area when a first cell with which the terminal device is currently registered comprises a non-allowed area.

2. The method of claim 1, further comprising performing communication with the network device in the second cell by using the 5G access technology when the second cell is found.

3. The method of claim 1, further comprising performing communication with the network device by using any one of a $4^{th}$ Generation (4G) access technology, a $3^{rd}$ Generation (3G) access technology, a $2.5^{th}$ Generation (2.5G) access technology, or a $2^{nd}$ Generation (2G) access technology when the second cell is not found.

4. The method of claim 1, further comprising adding one or more cells comprising the first cell, one or more tracking areas comprising a tracking area to which the first cell belongs, or the one or more cells and the one or more tracking areas to a temporary prohibition list, wherein the one or more cells and the one or more tracking areas belong to the non-allowed area.

5. The method of claim 4, further comprising deleting the one or more cells and the one or more tracking areas from the temporary prohibition list after communication between the terminal device and the network device ends or when a service request times out.

6. The method of claim 1, further comprising receiving a service area list from the network device, wherein the service area list indicates the non-allowed area or the allowed area.

7. The method of claim 1, further comprising searching for a third cell comprising the allowed area after entering an idle state.

8. The method of claim 7, further comprising initiating mobility registration to request camping on the third cell when the third cell is found.

9. The method of claim 1, wherein the terminal device is allowed to actively initiate communication with a network when the terminal device is in the allowed area, and wherein the terminal device is not allowed to actively initiate a service request or session management signaling other than a priority service to obtain a user service when the terminal device is in the non-allowed area.

10. An apparatus, comprising:
    a memory comprising a computer-executable instruction; and
    one or more processors coupled to the memory and configured to execute the instruction to cause the apparatus to be configured to:
        receive a user operation in a user interface of the apparatus requesting communication with a network device by using a $5^{th}$ Generation (5G) access technology; and
        search, in response to the user operation in the user interface of the apparatus, for a second cell comprising an allowed area when a first cell with which the apparatus is currently registered comprises a non-allowed area.

11. The apparatus of claim 10, wherein the instruction further causes the apparatus to be configured to communicate with the network device in the second cell by using the 5G access technology when the second cell is found.

12. The apparatus of claim 10, wherein the instruction further causes the apparatus to be configured to communicate with the network device by using any one of a $4^{th}$ Generation (4G) access technology, a $3^{rd}$ Generation (3G) access technology, a $2.5^{th}$ Generation (2.5G) access technology, or a $2^{nd}$ Generation (2G) access technology when the second cell is not found.

13. The apparatus of claim 10, wherein the instruction further causes the apparatus to be configured to add one or more cells comprising the first cell, one or more tracking areas comprising a tracking area to which the first cell belongs, or the one or more cells and the one or more tracking areas to a temporary prohibition list, and wherein the one or more cells and the one or more tracking areas belong to the non-allowed area.

14. The apparatus of claim 13, wherein the instruction further causes the apparatus to be configured to delete the one or more cells and the one or more tracking areas from the temporary prohibition list after communication between the apparatus and the network device ends or when a service request times out.

15. The apparatus of claim 10, wherein the instruction further causes the apparatus to be configured to receive a service area list from the network device, and wherein the service area list indicates the non-allowed area or the allowed area.

16. The apparatus of claim 10, wherein the instruction further causes the apparatus to be configured to search for a third cell comprising the allowed area after entering an idle state.

17. The apparatus of claim 16, wherein the instruction further causes the apparatus to be configured to initiate mobility registration to request camping on the third cell when finding the third cell.

18. The apparatus of claim 10, wherein the apparatus is allowed to actively initiate communication with a network when the apparatus is in the allowed area, and wherein the apparatus is not allowed to actively initiate a service request or session management signaling other than a priority service to obtain a user service when the apparatus is in the non-allowed area.

19. An apparatus, comprising:
a communications bus configured to be communicatively coupled to a memory and to receive a computer program from the memory; and
one or more processors coupled to the communications bus and configured to invoke the computer program to cause a terminal device on which the apparatus is installed to:

receive a user operation in a user interface of the terminal device requesting communication with a network device by using a $5^{th}$ Generation (5G) access technology; and
search, in response to the user operation in the user interface of the terminal device, for a second cell comprising an allowed area when a first cell with which the terminal device is currently registered comprises a non-allowed area.

20. The apparatus of claim 19, wherein the one or more processors are further configured to invoke the computer program to cause the terminal device on which the apparatus is installed to communicate with the network device in the second cell by using the 5G access technology when the second cell is found.

21. The method of claim 1, further comprising:
initiating, in response to the user operation and by an application processor, a service request; and
sending, by the application processor to a communications processor, the service request to instruct the communications processor to search for the second cell comprising the allowed area.

22. The method of claim 1, wherein receiving the user operation comprises making a call, opening a browser, or sending information.

* * * * *